US011923924B2

(12) United States Patent
Papa (10) Patent No.: US 11,923,924 B2
(45) Date of Patent: Mar. 5, 2024

(54) MINIATURE ANTENNA ARRAY WITH POLAR COMBINING ARCHITECTURE

(71) Applicant: Parallel Wireless, Inc., Nashua, NH (US)

(72) Inventor: Steven Paul Papa, Windham, NH (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 16/866,540

(22) Filed: May 4, 2020

(65) Prior Publication Data

US 2020/0280350 A1 Sep. 3, 2020

Related U.S. Application Data

(63) Continuation-in-part of application No. 16/286,548, filed on Feb. 26, 2019, now Pat. No. 11,159,187.

(Continued)

(51) Int. Cl.
*H04B 7/0452* (2017.01)
*H01Q 1/24* (2006.01)
(Continued)

(52) U.S. Cl.
CPC ........... *H04B 7/0452* (2013.01); *H01Q 1/243* (2013.01); *H01Q 21/00* (2013.01); *H04B 7/0426* (2013.01); *H04W 52/283* (2013.01)

(58) Field of Classification Search
CPC .... H04B 7/0452; H04B 7/0426; H01Q 1/243; H01Q 21/00; H04W 52/283
See application file for complete search history.

(56) References Cited

U.S. PATENT DOCUMENTS 2,640,930 A * 6/1953 Bucher .................. H01Q 15/12
343/756
2,759,183 A * 8/1956 Woodward, Jr. ....... H01Q 19/10
343/832
(Continued)

FOREIGN PATENT DOCUMENTS

AU 2006279901 A1 * 2/2008 ............... H04B 7/06
AU 2007215029 A1 * 10/2008 ........... H04B 7/0617
(Continued)

OTHER PUBLICATIONS

D. Chowdhury, S. V. Thyagarajan, L. Ye, E. Alon and A. M. Niknejad, "A fully-integrated efficient CMOS inverse Class-D power amplifier for digital polar transmitters," 2011 IEEE Radio Frequency Integrated Circuits Symposium, 2011, pp. 1-4, doi: 10.1109/RFIC.2011.5940656. (Year: 2011).*
(Continued)

*Primary Examiner* — Berhanu Tadese
(74) *Attorney, Agent, or Firm* — Michael Y. Saji; David W. Rouille (57) ABSTRACT

A microcomponent massive MIMO array is presented. The microcomponent massive array includes a general purpose processor and an integrated power amplifier and transmitter device including a software defined radio (SDR) and a plurality of polar power amplifiers (PAs) disposed on a single integrated circuit, wherein the integrated power amplifier and transmitter device is in communication with the general purpose processor. The microcomponent massive MIMO array further includes an antenna array in communication with the integrated power amplifier and transmitter device.

9 Claims, 9 Drawing Sheets

Related U.S. Application Data (60) Provisional application No. 62/843,360, filed on May 3, 2019, provisional application No. 62/712,172, filed on Jul. 30, 2018, provisional application No. 62/635,294, filed on Feb. 26, 2018.

(51) Int. Cl.
*H01Q 21/00* (2006.01)
*H04B 7/0426* (2017.01)
*H04W 52/28* (2009.01)

(56) References Cited

U.S. PATENT DOCUMENTS

| | | | | |
|---|---|---|---|---|
| 2,934,761 | A * | 4/1960 | Kandoian | H01Q 1/282 343/792 |
| 3,054,107 | A * | 9/1962 | Engel | H01Q 3/14 343/839 |
| 4,527,163 | A * | 7/1985 | Stanton | H01Q 21/08 343/791 |
| 5,412,414 | A * | 5/1995 | Ast | G01S 7/4017 342/372 |
| 5,534,880 | A * | 7/1996 | Button | H01Q 13/04 343/905 |
| 5,852,424 | A * | 12/1998 | Reineck | H01Q 1/42 343/872 |
| 5,898,405 | A * | 4/1999 | Iwasaki | H01Q 9/0457 343/846 |
| 6,337,659 | B1 * | 1/2002 | Kim | H01Q 3/30 342/373 |
| 6,362,796 | B1 * | 3/2002 | Bohlman | H01Q 11/105 343/895 |
| 6,956,838 | B2 * | 10/2005 | Ertel | H04W 16/02 370/339 |
| 7,054,292 | B2 * | 5/2006 | Hall | H04W 16/12 370/335 |
| 7,280,848 | B2 * | 10/2007 | Hoppenstein | H01Q 23/00 455/562.1 |
| 7,299,071 | B1 * | 11/2007 | Barratt | H04B 7/0697 455/562.1 |
| 7,406,261 | B2 * | 7/2008 | Shattil | H04L 27/00 398/202 |
| 7,573,419 | B2 * | 8/2009 | Falk | H01Q 21/08 342/146 |
| 7,656,360 | B2 * | 2/2010 | Hirabayashi | H01Q 3/44 343/893 |
| 7,916,083 | B2 * | 3/2011 | Thiesen | H01Q 21/065 342/372 |
| 8,098,198 | B2 * | 1/2012 | Thiesen | H01Q 3/2605 342/372 |
| 8,698,696 | B1 * | 4/2014 | McCandless | H01Q 21/0037 343/810 |
| 8,867,418 | B2 * | 10/2014 | Mishra | H04W 76/10 370/328 |
| 8,879,416 | B2 * | 11/2014 | Mishra | H04W 16/14 709/225 |
| 9,107,092 | B2 * | 8/2015 | Agarwal | H04W 64/006 |
| 9,113,352 | B2 * | 8/2015 | Agarwal | H04W 24/02 |
| 9,232,547 | B2 * | 1/2016 | Mishra | H04L 12/4633 |
| 9,455,959 | B1 * | 9/2016 | Garg | H04L 63/0281 |
| 9,513,361 | B1 * | 12/2016 | Elsallal | G01S 3/043 |
| 9,615,266 | B1 * | 4/2017 | Cheadle | H01Q 19/32 |
| 9,791,552 | B1 * | 10/2017 | Schuman | H01Q 3/267 |
| 9,960,883 | B1 * | 5/2018 | Chakraborty | H03D 7/1458 |
| 9,973,943 | B2 * | 5/2018 | Lysejko | H01Q 3/02 |
| 9,991,607 | B1 * | 6/2018 | West | H01Q 13/0275 |
| 10,014,887 | B1 * | 7/2018 | Gharavi | H04B 7/0606 |
| 10,050,698 | B2 * | 8/2018 | Tong | H04B 7/18515 |
| 10,070,325 | B2 * | 9/2018 | Logothetis | H04W 16/28 |
| 10,181,866 | B2 * | 1/2019 | Gharavi | H04B 7/0617 |
| 10,236,575 | B2 * | 3/2019 | Lundstedt | H01Q 15/16 |
| 10,298,275 | B2 * | 5/2019 | Gharavi | H04B 1/04 |
| 10,404,354 | B2 * | 9/2019 | Tong | H04B 7/18515 |
| 10,505,597 | B2 * | 12/2019 | Soriaga | H04W 88/02 |
| 10,581,415 | B2 * | 3/2020 | Chakraborty | H04B 7/084 |
| 10,663,563 | B2 * | 5/2020 | Schuman | G01S 7/4026 |
| 10,667,244 | B2 * | 5/2020 | Luo | H04L 1/0028 |
| 10,957,975 | B2 * | 3/2021 | Meyer | H04W 16/28 |
| 10,972,158 | B2 * | 4/2021 | Hu | H04B 7/0617 |
| 11,196,444 | B2 * | 12/2021 | Chen | H03M 13/09 |
| 11,303,040 | B2 * | 4/2022 | Stumme | H01Q 25/001 |
| 11,336,028 | B2 * | 5/2022 | Shen | H01Q 25/00 |
| 11,342,665 | B1 * | 5/2022 | Reuveni | H01Q 1/2283 |
| 11,424,539 | B2 * | 8/2022 | Alpman | H01L 25/18 |
| 2002/0051436 | A1 * | 5/2002 | Ertel | H04W 16/12 370/335 |
| 2002/0067759 | A1 * | 6/2002 | Ertel | H01Q 3/26 375/141 |
| 2002/0071384 | A1 * | 6/2002 | Hall | H04W 16/12 370/335 |
| 2002/0135514 | A1 * | 9/2002 | Yoshida | H04B 1/712 375/E1.032 |
| 2002/0187812 | A1 * | 12/2002 | Guo | H04B 7/0634 455/562.1 |
| 2004/0125038 | A1 * | 7/2004 | Diximus | H01Q 21/10 343/790 |
| 2004/0198453 | A1 * | 10/2004 | Cutrer | H04W 88/08 455/562.1 |
| 2005/0179615 | A1 * | 8/2005 | Mrstik | H01Q 15/20 343/915 |
| 2007/0001924 | A1 * | 1/2007 | Hirabayashi | H01Q 19/32 343/893 |
| 2007/0019748 | A1 * | 1/2007 | Hoo | H04L 27/2679 375/260 |
| 2007/0040758 | A1 * | 2/2007 | Dwyer | H01Q 21/062 343/792 |
| 2009/0103593 | A1 * | 4/2009 | Bergamo | H04B 7/086 375/E1.002 |
| 2012/0071112 | A1 * | 3/2012 | Rofougaran | H04W 88/06 455/90.2 |
| 2013/0106667 | A1 * | 5/2013 | Fenn | H01Q 1/525 343/866 |
| 2013/0235807 | A1 * | 9/2013 | Lee | H01Q 1/246 370/329 |
| 2014/0086120 | A1 * | 3/2014 | Mishra | H04W 24/02 370/310 |
| 2014/0133456 | A1 * | 5/2014 | Donepudi | H04L 67/568 370/328 |
| 2014/0176385 | A1 * | 6/2014 | Apostolos | H01Q 21/24 343/790 |
| 2015/0094114 | A1 * | 4/2015 | Rao | H04W 52/143 455/522 |
| 2015/0098385 | A1 * | 4/2015 | Navalekar | H04W 64/003 370/312 |
| 2015/0098387 | A1 * | 4/2015 | Garg | H04W 36/0085 370/328 |
| 2015/0116185 | A1 * | 4/2015 | Wang | H01Q 21/22 343/893 |
| 2015/0257051 | A1 * | 9/2015 | Rao | H04W 36/14 455/552.1 |
| 2016/0044531 | A1 * | 2/2016 | Papa | H04W 28/0247 370/230 |
| 2016/0127003 | A1 * | 5/2016 | Xu | H01Q 21/28 455/562.1 |
| 2016/0134337 | A1 * | 5/2016 | Branlund | H04W 24/02 455/446 |
| 2016/0164474 | A1 * | 6/2016 | Beltran Lizarraga | H03F 3/24 330/275 |
| 2016/0178731 | A1 * | 6/2016 | Stove | G01S 7/41 342/93 |
| 2016/0259923 | A1 * | 9/2016 | Papa | H04W 12/35 |
| 2017/0013513 | A1 * | 1/2017 | Agarwal | H04W 24/02 |
| 2017/0019375 | A1 * | 1/2017 | Garg | H04L 63/164 |
| 2017/0026845 | A1 * | 1/2017 | Garg | H04W 16/10 |
| 2017/0048710 | A1 * | 2/2017 | Agarwal | H04L 63/0884 |
| 2017/0055186 | A1 * | 2/2017 | Donepudi | H04W 36/00835 |
| 2017/0064621 | A1 * | 3/2017 | Garg | H04W 48/18 |
| 2017/0070436 | A1 * | 3/2017 | Lubenski | H04L 1/1893 |
| 2017/0077979 | A1 * | 3/2017 | Papa | H04B 1/40 |
| 2017/0085005 | A1 * | 3/2017 | Aue | H04B 1/40 |

(56) References Cited

U.S. PATENT DOCUMENTS

| | | | |
|---|---|---|---|
| 2017/0111482 A1* | 4/2017 | Mishra | G01S 19/46 |
| 2017/0127409 A1* | 5/2017 | Mishra | H04W 28/26 |
| 2017/0164226 A1* | 6/2017 | Wei | H04L 1/0026 |
| 2017/0170903 A1* | 6/2017 | Jain | H04B 10/6972 |
| 2017/0171828 A1* | 6/2017 | Rao | H04W 52/283 |
| 2017/0181119 A1* | 6/2017 | Garg | G01S 19/13 |
| 2017/0188286 A1* | 6/2017 | Yonekura | H04W 36/0069 |
| 2017/0202006 A1* | 7/2017 | Rao | H04W 72/542 |
| 2017/0207528 A1* | 7/2017 | Lundstedt | H01Q 15/16 |
| 2017/0208560 A1* | 7/2017 | Papa | H04W 56/006 |
| 2017/0238278 A1* | 8/2017 | Yadav | H04W 68/04 370/329 |
| 2017/0257133 A1* | 9/2017 | Papa | H04W 88/085 |
| 2017/0272330 A1* | 9/2017 | Cao | H04W 84/045 |
| 2017/0273134 A1* | 9/2017 | Cao | H04W 76/32 |
| 2017/0288813 A1* | 10/2017 | Khan | H04L 1/0061 |
| 2017/0295510 A1* | 10/2017 | Sharma | H04J 11/005 |
| 2017/0303163 A1* | 10/2017 | Sharma | H04L 27/2665 |
| 2017/0324455 A1* | 11/2017 | Soriaga | H04L 25/0202 |
| 2017/0347307 A1* | 11/2017 | Mehta | H04W 76/15 |
| 2018/0035334 A1* | 2/2018 | Lohar | H04W 24/02 |
| 2018/0041927 A1* | 2/2018 | Raval | H04W 36/0061 |
| 2018/0041934 A1* | 2/2018 | Agarwal | H04W 36/02 |
| 2018/0049275 A1* | 2/2018 | Agarwal | H04L 65/65 |
| 2018/0063745 A1* | 3/2018 | Jain | H04B 10/2507 |
| 2018/0123950 A1* | 5/2018 | Garg | H04L 47/22 |
| 2018/0152865 A1* | 5/2018 | Atri | H04W 36/0022 |
| 2018/0160337 A1* | 6/2018 | Gupta | H04W 36/0061 |
| 2018/0175809 A1* | 6/2018 | Zai | H03F 3/19 |
| 2018/0262242 A1* | 9/2018 | Chakraborty | H04B 7/0665 |
| 2018/0279292 A1* | 9/2018 | Luo | H04L 5/001 |
| 2018/0299835 A1* | 10/2018 | Testi | G04F 10/005 |
| 2018/0301791 A1* | 10/2018 | Jin | H01Q 25/001 |
| 2019/0014585 A1* | 1/2019 | Mishra | H04W 36/04 |
| 2019/0036215 A1* | 1/2019 | Shahmohammadian | H01Q 3/40 |
| 2019/0036587 A1* | 1/2019 | Nilsson | H01Q 3/24 |
| 2019/0081385 A1* | 3/2019 | Avser | H01Q 5/328 |
| 2019/0081386 A1* | 3/2019 | Edwards | H01Q 5/328 |
| 2019/0081410 A1* | 3/2019 | Zhou | H01Q 1/2258 |
| 2019/0123439 A1* | 4/2019 | Katz | G01S 19/36 |
| 2019/0199334 A1* | 6/2019 | Chakraborty | H04B 7/0452 |
| 2019/0268028 A1* | 8/2019 | Papa | H01Q 1/246 |
| 2019/0356516 A1* | 11/2019 | Cao | H04L 25/0256 |
| 2019/0364616 A1* | 11/2019 | Mishra | H04W 88/16 |
| 2020/0091608 A1* | 3/2020 | Alpman | H01Q 1/2283 |
| 2020/0128414 A1* | 4/2020 | Mishra | H04W 48/08 |
| 2020/0158859 A1* | 5/2020 | Morton | G01S 13/887 |
| 2020/0178084 A1* | 6/2020 | Mishra | H04W 84/20 |
| 2020/0196378 A1* | 6/2020 | Cao | H04W 16/18 |
| 2020/0252996 A1* | 8/2020 | Mishra | H04B 1/40 |
| 2020/0274613 A1* | 8/2020 | Gao | H04B 7/0456 |
| 2020/0280350 A1* | 9/2020 | Papa | H01Q 21/205 |
| 2020/0328785 A1* | 10/2020 | Lee | H04B 7/0695 |
| 2020/0343909 A1* | 10/2020 | Chen | H03M 13/09 |
| 2022/0140842 A1* | 5/2022 | Chen | H04L 1/0041 714/758 |

FOREIGN PATENT DOCUMENTS

| | | | |
|---|---|---|---|
| AU | 2007215090 A1 * | 10/2008 | B24B 37/16 |
| AU | 2007230975 A1 * | 10/2008 | H01Q 3/26 |
| AU | 2006279901 B2 * | 3/2011 | H04B 7/06 |
| AU | 2007215029 B2 * | 4/2011 | H04B 7/0617 |
| AU | 2007230975 B2 * | 6/2011 | H01Q 3/26 |
| AU | 2009317877 A1 * | 6/2011 | G01S 13/753 |
| BE | 1010979 A4 * | 3/1999 | G01S 13/4463 |
| CA | 1339283 C * | 8/1997 | G01S 13/4463 |
| CA | 2226370 C * | 11/2006 | G01S 7/032 |
| CA | 2743955 A1 * | 5/2010 | G01S 13/753 |
| CN | 105390822 A * | 3/2016 | H01Q 1/36 |
| CN | 107659895 A * | 2/2018 | G01S 13/756 |
| CN | 207410340 U * | 5/2018 | |
| CN | 207677092 U * | 7/2018 | |
| CN | 110099447 A * | 8/2019 | H04W 68/005 |
| CN | 110447146 A * | 11/2019 | H01L 23/4855 |
| CN | 107078810 B * | 5/2020 | H01Q 3/22 |
| DE | 112017006442 T5 * | 9/2019 | H01L 23/4855 |
| EP | 3285406 A1 * | 2/2018 | H01Q 21/28 |
| GB | 2300076 A * | 10/1996 | G01S 13/4463 |
| GB | 2315644 A * | 2/1998 | H01Q 25/00 |
| JP | 2002158602 A * | 5/2002 | |
| JP | 3787159 B2 * | 6/2006 | G01S 7/032 |
| JP | 2018094706 A * | 6/2018 | |
| JP | 7089519 B2 * | 6/2022 | H01L 23/4855 |
| KR | 2018094706 A * | 8/2018 | A61B 1/0008 |
| TW | 200810443 A * | 2/2008 | H04L 45/24 |
| TW | 201731238 A * | 9/2017 | H01Q 21/06 |
| WO | WO-2013105920 A2 * | 7/2013 | H02J 17/00 |
| WO | WO-2013134128 A1 * | 9/2013 | H01Q 1/246 |
| WO | WO-2017192714 A1 * | 11/2017 | H01Q 1/005 |
| WO | WO-2018091203 A1 * | 5/2018 | H04B 7/04 |
| WO | WO-2018094706 A1 * | 5/2018 | H03F 3/245 |
| WO | WO-2018119153 A2 * | 6/2018 | H01L 23/4855 |
| WO | WO-2019091234 A1 * | 5/2019 | H03M 13/09 |

OTHER PUBLICATIONS

Understanding Active and Passive Antennas by Alex Milne, 2014-2017—Internet Citation—www.rfwireless-world.com (Year: 2014).*
WO2018094706, (WIPO Translated Foreign Patent) (Year: 2018).*
WO2018094706, (Chinese Language Publication, Foreign Patent) (Year: 2018).*
Chowdhury et al. A Fully-Integrated Efficient CMOS Power Amplifier for Digital Polar Transmitter, IEEE 2011 (Year: 2011).*
WO2018094706, (Chinese Language Publication) (Year: 2018).*
WO2018094706, (WIPO Translation) (Year: 2018).*
"Smart Basestation Antenna for Next Generation Mobile Communication" Airrays Wireles Solutions, Peter Meyer, Airrays GmbH.
ArXiv:1801.06023v1, Jan. 18, 2018; "A Digital Predistortion Scheme Exploiting Degrees-of-Freedom for Massive MIMO Systems"; Miao Yao, Munawwar Sohul, Randall Nealy, Vuk Marojevic and Jeffrey Reed.
Research Gate Mar. 19, 2018 ;"What Type of Power Amplifiers are to be Used in Massive MIMO?"; Emil Bjornson, Michael Foegelle, Abdelrahman Arbi; https://www.researchgate.net/post/What_type_of_power_amplifiers_are_to_be_used_in_Massive_MIMO.

* cited by examiner

MINIATURE ANTENNA ARRAY WITH POLAR COMBINING ARCHITECTURE

CROSS-REFERENCE TO RELATED APPLICATIONS

This application is a continuation-in-part of, and claims priority under 35 U.S.C. § 120 to, U.S. patent application Ser. No. 16/286,548, "Microcomponent Massive MIMO Arrays" filed Feb. 26, 2019; and also claims priority under 35 U.S.C. § 119(e) to U.S. Provisional Pat. App. No. 62/843,360, entitled "Miniature Antenna Array With Polar Combining Architecture" and filed May 3, 2019; and also claims priority under 35 U.S.C. § 119(e) to U.S. Provisional Pat. App. No. 62/635,294, entitled "Microcomponent Massive MIMO Arrays" and filed Feb. 26, 2018; and further claims priority under 35 U.S.C. § 119(e) to U.S. Provisional Pat. App. No. 62/712,172, entitled "System and Method for Massive MIMO Communication" and filed Jul. 30, 2018; each of the aforementioned references being hereby incorporated by reference in its entirety for all purposes. In addition, this application hereby incorporates by reference, for all purposes, each of the following publications in their entirety for all purposes: U.S. Pat. App. Pub. Nos. US20140133456A1, US20150094114A1, US20150098385A1, US20150098387A1, US20160044531A1, US20170013513A1, US20170019375A1, US20170026845A1, US20170048710A1, US20170055186A1, US20170064621A1, US20170070436A1, US20170077979A1, US20170111482A1, US20170127409A1, US20170171828A1, US20170181119A1, US20170202006A1, US20170208560A1, US20170238278A1, US20170257133A1, US20170272330A1, US20170273134A1, US20170288813A1, US20170295510A1, US20170303163A1, US20170347307A1, US20180123950A1, US20180152865A1, and US20180299835A1; and U.S. Pat. Nos. 8,867,418, 8,879,416, 9,107,092, 9,113,352, 9,232,547, and 9,455,959.

BACKGROUND

Massive MIMO radio transmitters are known to one of ordinary skill in the art. In radio, multiple-input and multiple-output, or MIMO is a method for multiplying the capacity of a radio link using multiple transmission and receiving antennas to exploit multipath propagation. At one time, in wireless the term "MIMO" referred to the use of multiple antennas at the transmitter and the receiver. In modern usage, "MIMO" specifically refers to a practical technique for sending and receiving more than one data signal simultaneously over the same radio channel by exploiting multipath propagation. MIMO is synergistically compatible with smart antenna techniques developed to enhance the performance of a single data signal, such as beamforming and diversity. "Massive MIMO" is the extension of the MIMO concept to use large antenna arrays to simultaneously serve many autonomous terminals using multiple antennas, but using the smart antenna techniques of beamforming, etc. to provide spatial multiplexing of many terminals in the same time-frequency resource with high energy efficiency. A typical massive MIMO antenna is a 64T64R (T=transmit, R=receive) antenna array of substantial physical size.

In a rich scattering environment, the full advantages of the massive MIMO system can be exploited using simple beamforming strategies such as maximum ratio transmission (MRT), maximum ratio-combining (MRC) or zero forcing (ZF). To achieve these benefits of massive MIMO, accurate channel state information (CSI) must be available perfectly, and the M-MIMO radio antennas must be in perfect synch.

SUMMARY OF THE INVENTION

The invention relates generally to Multiple Input Multiple Output (MIMO) arrays, and in particular, microcomponent massive MIMO arrays using one or more polar Power Amplifiers (PAs).

In an example embodiment, a microcomponent massive MIMO array is disclosed comprising: a general purpose processor; an integrated power amplifier and transmitter device including a Software Defined Radio (SDR) and a plurality of polar Power Amplifiers (PAs). The integrated power amplifier and transmitter device is in communication with the general purpose processor. An antenna array is in communication with the integrated power amplifier and transmitter device. The presently disclosed microcomponent massive MIMO array uses a highly focused low power beam to transmit a high bandwidth data signal.

A microcomponent massive MIMO array comprising: a general purpose processor; an integrated power amplifier and transmitter device including a software defined radio (SDR) and a plurality of polar power amplifiers (PAs) disposed on a single integrated circuit, wherein the integrated power amplifier and transmitter device may be in communication with the general purpose processor; and an antenna array in communication with the integrated power amplifier and transmitter device.

The microcomponent massive MIMO array may further comprise a baseband processor in communication with the general purpose processor and the integrated power amplifier and transmitter device. The microcomponent massive MIMO array may further comprise a digital pre-distortion (DPD) circuit integrated with the SDR. The digital pre-distortion (DPD) may comprise a Field Programmable Gate Array (FPGA). An accelerator may be used in place of the FPGA. The microcomponent massive MIMO array may further comprise a filter integrated with each polar PA. The microcomponent massive MIMO array may further comprise a duplexer for performing Frequency Division Duplexing (FDD) disposed between an output of the an integrated power amplifier and transmitter device and an input to the antenna array. Each polar PA may comprise a one-quarter watt PA. A PA further may include a low noise amplifier (LNA), and/or a crest factor reduction (CFR) circuit. An accelerator may be used in place of the SDR. The array may use a radio technology selected from the group comprising 2G, 3G, 4G and 5G. The array may be situated in a base station. The array may be situated in an omnidirectional antenna array. The array may be situated in a mobile device.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

With the upcoming development of 5G radio technologies, it is desirable to have high bandwidth radio solutions that operate efficiently. From this graph it can be seen that the power amplifier efficiency is much larger at 40 W power delivery than at 0.5 W or 1 W power delivery. One technique being explored to enable higher bandwidth is called Massive MIMO. According to this approach, multiple small independent antenna arrays are ganged together to output a MIMO signal. MIMO offers the advantage that a beam can be pointed in a particular direction (i.e., beamforming), which further enables the use of a highly-focused low power beam to effectively transmit a high bandwidth data signal. However, one obstacle to developing Massive MIMO technologies has been power efficiency of the radio transmit chain.

The radio transmit chain includes many components, including a baseband processor, an RF transmitter, a power amplifier, a filter (which may be required to be customized to a particular set of frequencies), and an antenna, along with any necessary cabling. The baseband processor generates a digital signal, which is turned into radio pulses by the RF transmitter (referred to herein as the "radio," in some cases). The power amplifier (or PA) is used to amplify the radio pulses prior to output to the antenna. These power amplifiers are among the most power hungry components in the RF chain, and in many cases are most efficient when saturated (configured to amplify at or near their maximum rated output). It follows that when scaled down to lower power applications, power amplifiers become substantially less efficient. For example, for transmissions at 1 W, a power amplifier rated at 4 W is not uncommon to be required to avoid distorting the signal.

Certain techniques are known to improve the performance and power efficiency of power amplifiers. For example, a technique is known called digital pre-distortion (DPD). DPD pre-distorts the input to the power amplifier such that the output of the power amplifier is more linear, thereby increasing the power-efficient "sweet spot" of the power amplifier. DPD provides a cost-effective linearization technique. DPD features an excellent linearization capability, the ability to preserve overall efficiency, and takes full advantage of advances in digital signal processors and A/D converters. DPD adds an expanding nonlinearity in the baseband that complements the compressing characteristic of the PA. Ideally, the cascade of the pre-distorter and the power amplifier becomes linear and the original input is amplified by a constant gain. With the pre-distorter, the power amplifier can be utilized up to its saturation point while still maintaining good linearity, thereby significantly increasing its efficiency.

However, DPD is expensive in multiple senses of the word. DPD requires digital circuits to provide this functionality, and these digital circuits require power to provide their functionality. For this reason, DPD is not commonly used for power amplifiers that output under 1 W of transmit power.

This lack of efficiency has not been solved previously, as the majority of commercial implementations require power output of 40 W to 80 W or above. However, Massive MIMO has different characteristics, and specifically requires DPD in order to provide beamforming. Where 2 40 W PAs could previously be used to output 80 W, or 4× 20 W PAs to output 80 W, the use of 64 or more transmitters to output 80 W requires high power efficiency at 1.25 W. A new approach is required to handle this problem.

A massive MIMO requires high efficiency PAs. Generally, PAs are not efficient below 20-30 Watts (W), as 0.5-3 W are traditionally not considered useful. For delivering 80 W output with 64× MIMO, each RF chain needs a PA at 80±64=1¼ W. Another problem is that DPD (digital pre-distortion) is needed for efficiency and it is required for Massive MIMO. DPD must account for analog beamforming, which takes place after the baseband and after the DPD, which typically requires a tight coupling between the DPD and the beamforming portion of the RF chain. But since DPD electronics are power-hungry, the secondary issue becomes how to provide DPD for each channel without low efficiency. It simply is not power-efficient to include DPD for each channel in the conventional manner when creating RF chains with a target output power of less than 20-30 W.

Disclosed herein is an innovative integrated power amplifier and on-chip transmitter. The inventors have made the key insight that a polar power amplifier can be used in a high-efficiency RF chain without requiring DPD. This novel transmitter incorporates the polar PA, meaning that it provides precise control of phase as well as amplitude of the output signal. Being able to control phase enables an array of such polar transmitters to form a phased array, which enables beamforming to be performed without the power overhead of requiring DPD. This integrated PA and polar transmitter is thus the ideal building block for a microcomponent massive MIMO array.

Control of phase by a polar transmitter array also enables complex modulations and higher frequency transmissions, which is ideal for 5G and other new RF technologies; as well, such a transmitter array is able to emit higher-frequency, lower-wavelength waveforms, which is ideal for the mm Wave technologies proposed for 5G.

Traditional systems for MIMO arrays a general purpose processor, a baseband processor, a DPD element, a 40 W radio, a PA, a filter, and optionally a duplexer for Frequency division duplexing (FDD). The power amplifier in this scenario is most efficient at the 40 W power usage, and much less efficient in the 0.5 W to 1 W power usage.

Figure 1A:
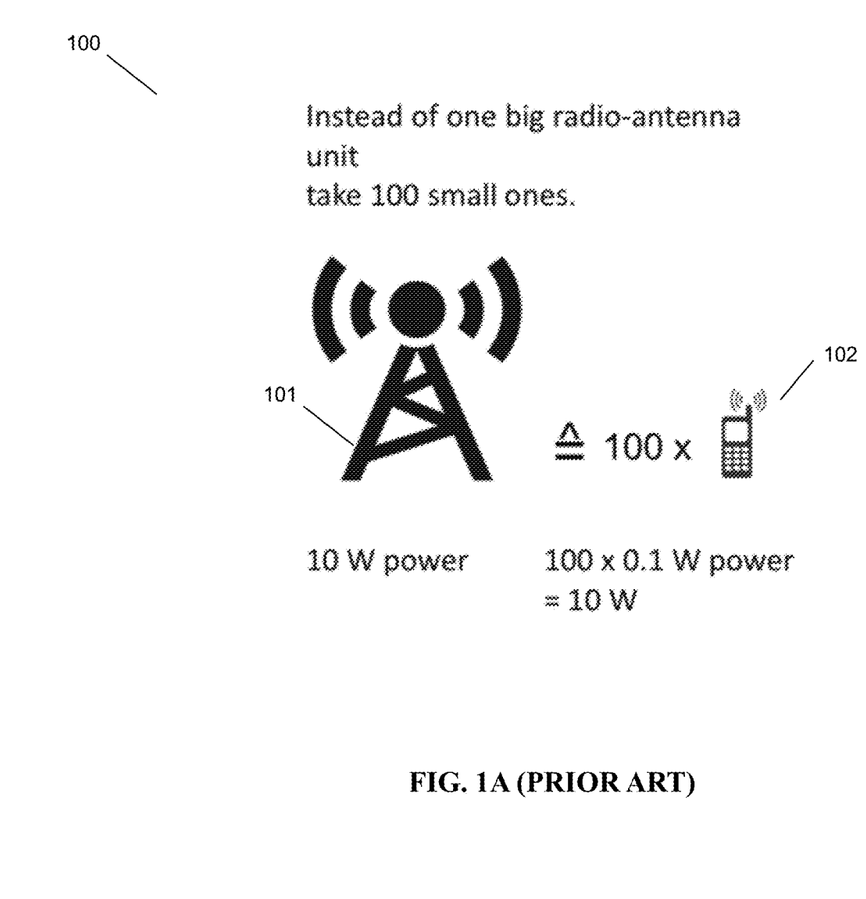
FIG. 1A depicts a prior art diagram of power by scaling for a massive MIMO system.
Figure 1B:
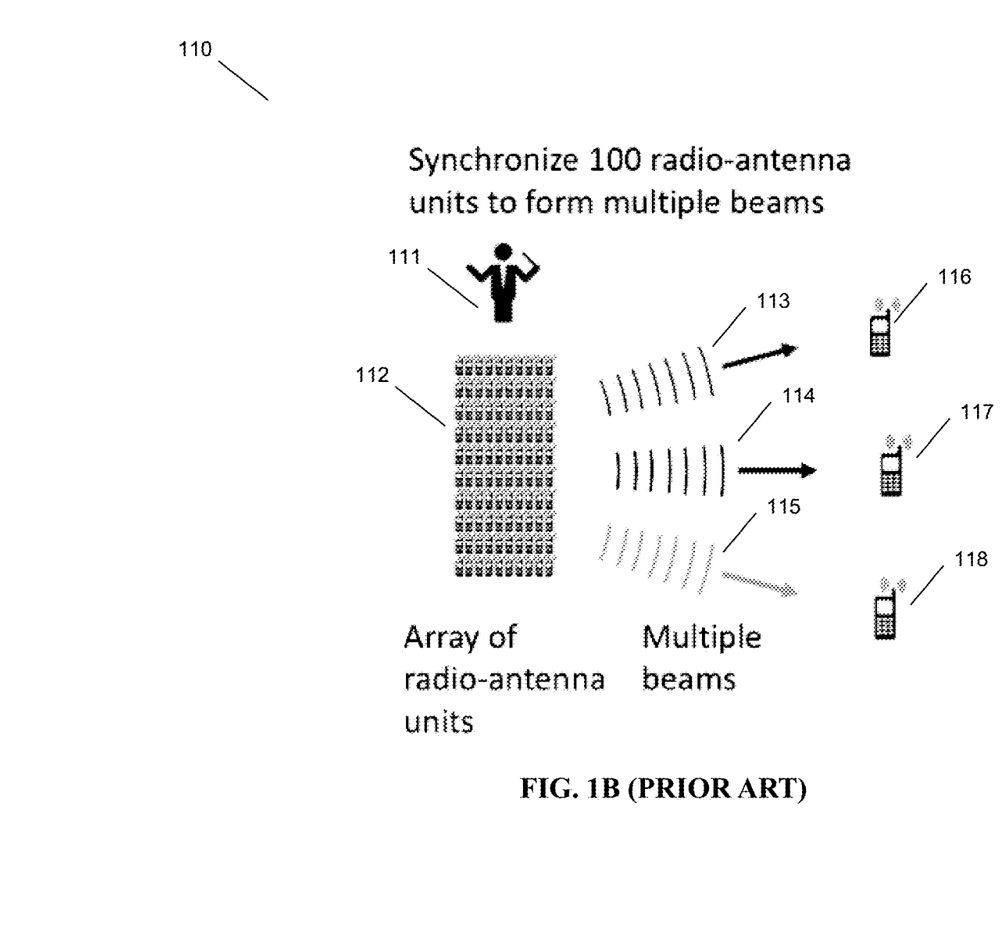
FIG. 1B depicts a prior art diagram of beamforming by synchronization for a massive MIMO system.
Figure 1C:
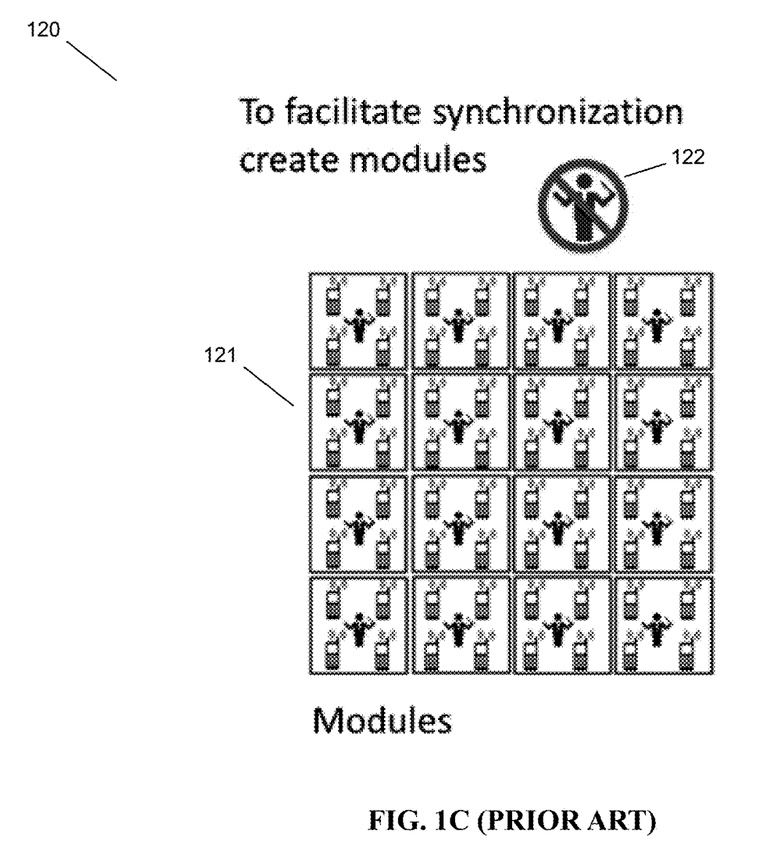
FIG. 1C depicts a prior art diagram of modularization for a massive MIMO system.

Referring to FIGS. 1A-1C, the general idea of massive MIMO is shown. As shown in FIG. 1A, a diagram 100 showing power by scaling is presented. Instead of using a single large antenna 101, multiple smaller antennas 102 are used. As shown in FIG. 1B, a diagram 110 showing beamforming is presented. An array of radio antennas 112 is synchronized by synchronizer 111 to form multiple beams 113, 114, 115, which enable beamforming to create beams directed to mobile devices 116, 117, 118. In FIG. 1C, a diagram showing modularization 120 is presented. Modules 121 are created to facilitate synchronization without synchronizer 122.

Figure 2:
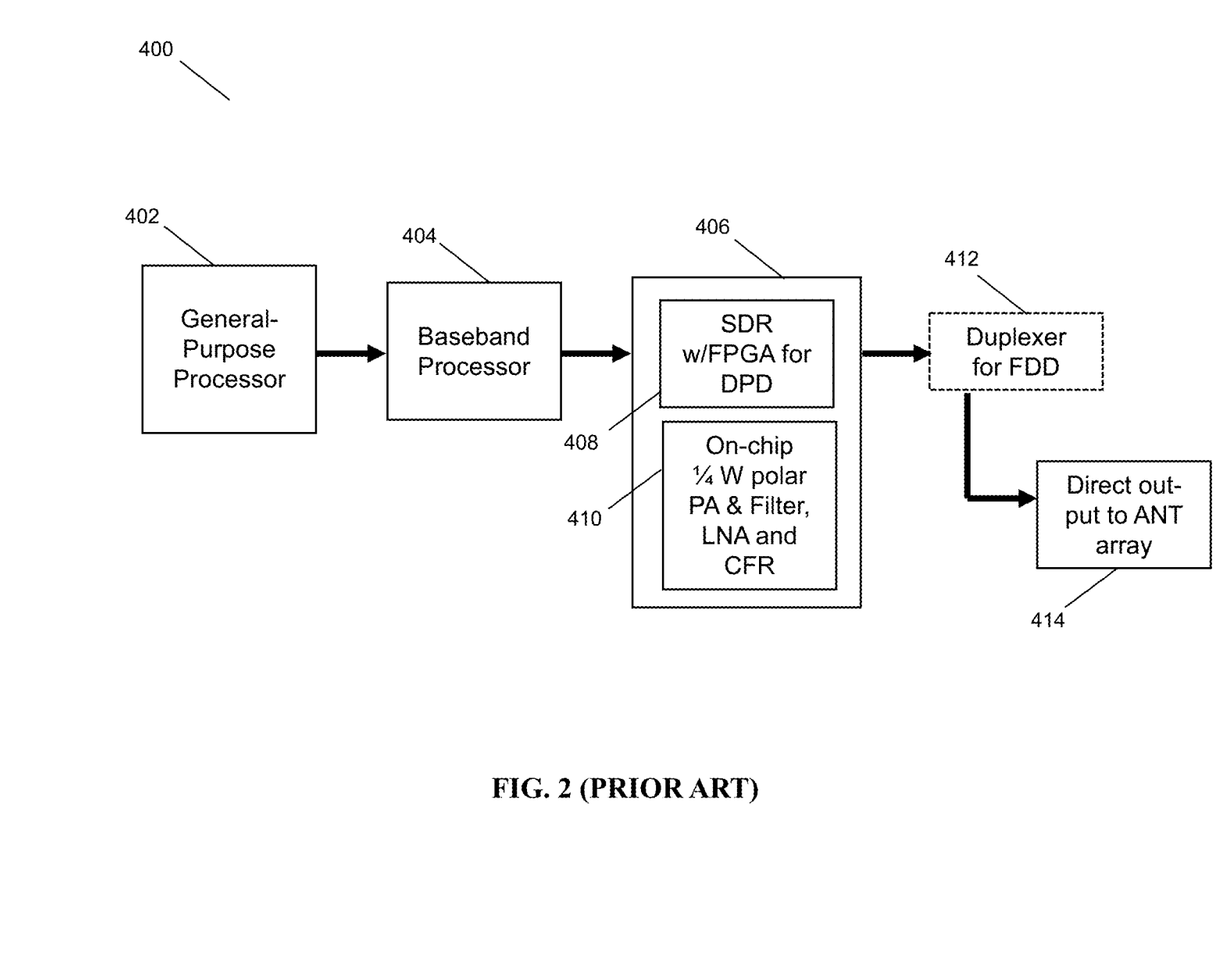
FIG. 2 depicts a prior art diagram of a massive MIMO system.

FIG. 2 shows a prior art system 200 for providing a massive MIMO RF chain. The system 200 includes a general purpose processor 210 in communication with a baseband processor 220. The baseband processor 220 is used to perform baseband signal processing. DPD 230 is coupled to the output of the baseband processor 220, such that DPD is used to provide increased linearity and thus power efficiency for the radio.

The output of the DPD 230 is provided to a radio 240. In this example the radio is shown as a 40 Watt (W) radio, though it should be understood that different power radios could also be used. The output of radio 240 is fed to a single power amplifier 250. The 40 W radio is configured in combination with the DPD 230 and power amplifier 250 such that the combination is considered relatively power-efficient. The output of the power amplifier is provided to filter 260. The filter is used to provide a particular set of frequencies.

An optional duplexer 270 for use when generating signals in Frequency Division Duplex (FDD) is shown connected to the output of the Filter 260. The FDD utilizes a technique where separate frequency bands are used at the transmitter and receiver side. Because the FDD technique uses different frequency bands for send and receive operations, the sending and receiving data signals don't interfere with each other. This often makes FDD a better choice than Time Division Duplex (TDD) for symmetric traffic such as voice applications in broadband wireless networks. While FDD is described herein, the techniques described apply also to TDD systems.

The prior art system 200 shows a system that is considered state of the art for power efficiency. However, this system configuration (called the RF chain) is not power-efficient for lower-power radios.

Figure 3:
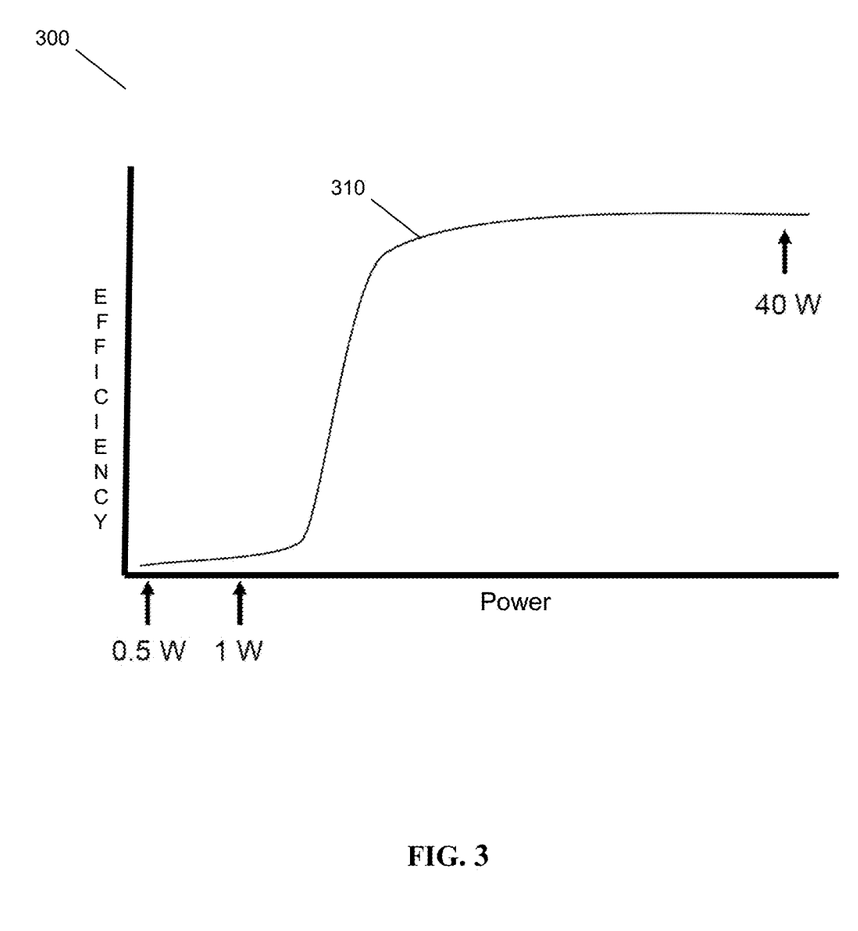
FIG. 3 depicts a prior art graph of power versus efficiency for a power amplifier.

FIG. 3 is a graph 300 having power values along a horizontal axis, and efficiency values along a vertical axis. The typical 40 W radio as shown in FIG. 2 has a highest efficiency at the 40 W power level, and significantly less efficiency at the 0.5 W and 1 W power levels as shown by line 310.

Figure 4:
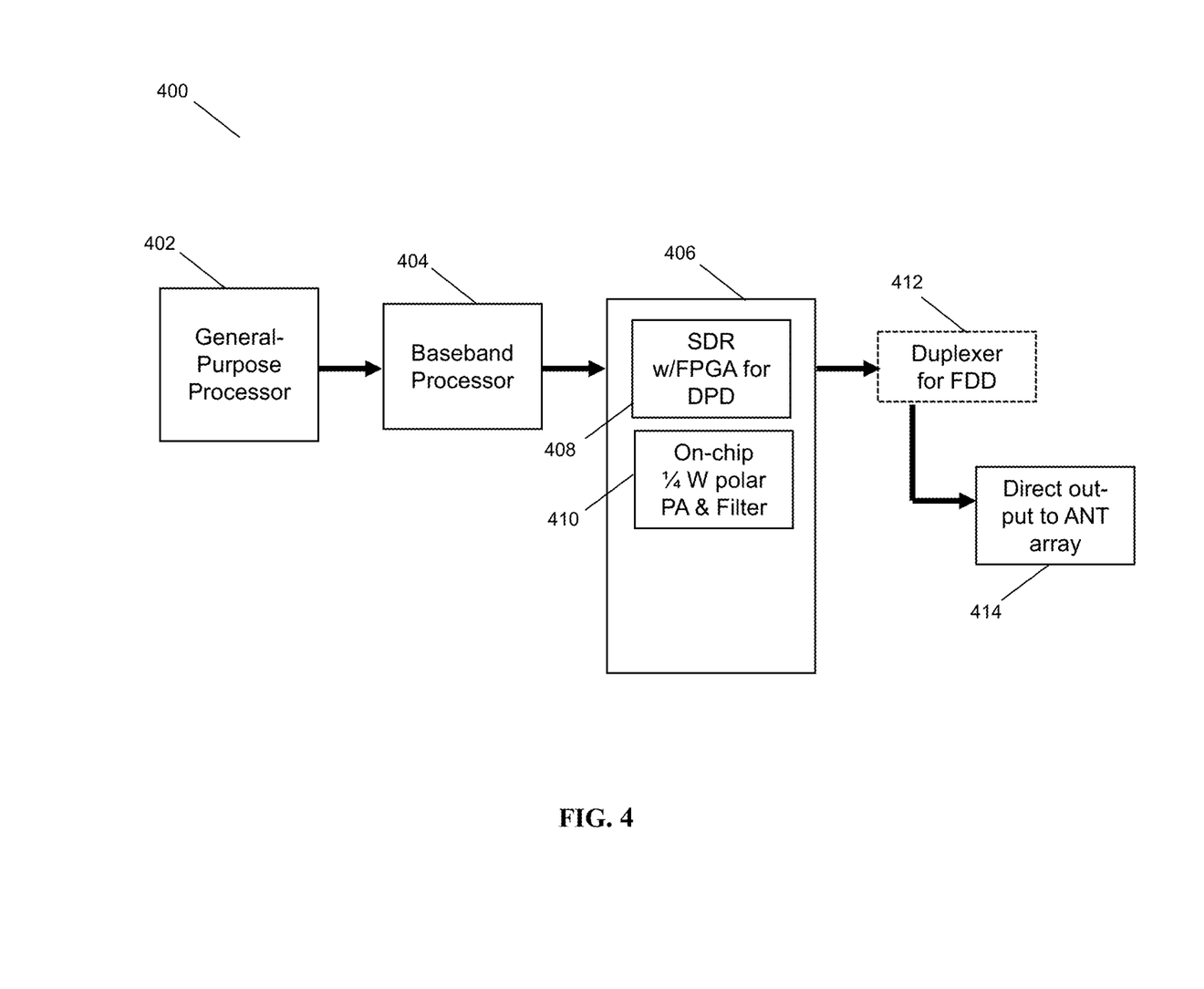
FIG. 4 depicts a diagram of a first microcomponent massive MIMO array architecture, in accordance with some embodiments.

FIG. 4 shows a first embodiment of a system for providing a microcomponent massive MIMO array 400. The system 400 includes a general purpose processor 402 in communication with a baseband processor 404. The baseband processor 404 is used to perform baseband signal processing.

Also shown is an integrated power amplifier and transmitter device 406 in communication with the baseband processor. The integrated power amplifier and transmitter device 406 includes a Software Defined Radio (SDR) 408 and one or more polar Power Amplifiers (PAs) 410. The SDR may include a Field Programmable Gate Array (FPGA) for providing digital pre-distortion (DPD). The polar PAs enable precise control of phase for high efficiency at the on-chip PA, as well as enabling beamforming even when ganged together in a MIMO array.

A Low Noise Amplifier (LNA) (not shown) may also be included as part of the integrated power amplifier and transmitter device 406. An LNA is a type of electronic amplifier that amplifies a very low-power signal without significantly degrading its signal-to-noise ratio. A Crest Factor Reduction (CFR) device (not shown) may also be included as part of the integrated power amplifier and transmitter device 406. A CFR device is used to reduce the Peak to Average Power Ratio (PAPR) of the transmitted signals so that the power amplifier can operate more efficiently.

An optional Frequency Division Duplexer (FDD) 412 is shown connected to the output of the integrated power amplifier and transmitter device 406, for use with FDD signal generation. Also shown is the direct output to the Antenna array 414.

In some example embodiments, accelerators can be used in place of SDR, FPGAs and can provide DPD if needed. Filtering can be provided by the inclusion of a filter on each PA chip, or as one or more external filters (connected between the output and the RF emitter in the antenna array). Accelerators as used herein could mean any 2G, 3G, 4G, 5G PHY, hard-coded logic module; or, they could mean any logic module providing Fourier transforms (FFTs) and other math functionality.

A single system-on-chip could provide baseband on one chip and the entire RF chain on another chip, including: a software-defined radio (SDR); 2 W PA; low-noise amplifier (LNA); filter; DPD and crest factor reduction (CFR) circuitry.

Alternately, the baseband chip could be omitted and this functionality could be performed by a general-purpose chip. Alternately, anywhere a radio chip is mentioned, a software-defined radio (SDR) could be used. Alternately, anywhere an FPGA, which is commonly used to implement an SDR, is mentioned, the FPGA could be replaced by a general purpose chip with a special-purpose accelerator logic circuit built in.

Adding FPGA functionality to the digital radio chip is less costly than requiring an FPGA, as it is relatively cheap to add space to an existing die. Additional DPD, CFR functionality could be added to the radio chip as well. Accelerators here could mean any 2G, 3G, 4G, 5G PHY, hard-coded logic module; or, they could mean any logic module providing FFT and other math functionality.

In a beamforming array the transmit will be slightly different in each element, so the interference cancellation should be aware of how that transmit is shifted. In some embodiments, a power amplifier with sharp control over amplification can be used, to generate a carrier with limited noise.

Figure 5:
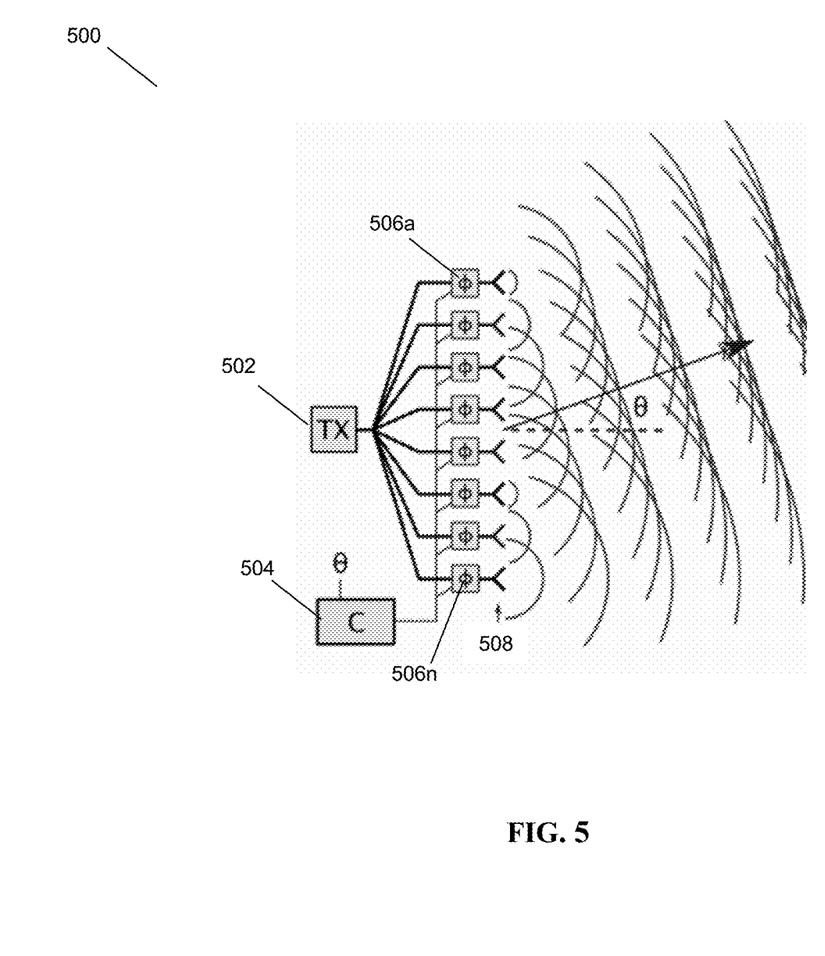
FIG. 5 depicts a diagram of a phased array, in accordance with some embodiments.

Referring now to FIG. 5, a phased array 500 is shown. The phased array includes an array of microcomponent radio elements 506, powered by a feed signal 502. The feed signal passes through the plurality of microcomponent radio elements (506a-506n), which may each be in the form shown in FIG. 4 as radio chip 400, and controlled by a computer 504. The wavefronts of the radio waves emitted by each element 508a-508n are shown. The individual wavefronts are spherical, but they combine (superpose) in front of the antenna to create a plane wave, a beam of radio waves traveling in a specific direction by having each antenna emits its wavefront later than the one below it, with the resulting plane wave to be directed at an angle θ to the antenna's axis. Due to the use of polar power amplifiers, it is possible to combine multiple radio chips 506a-506n such that the output of these radio chips does not interfere and instead is able to be used to perform beamforming by additively combining outputs of subsets of radio chips 506a-506n with high efficiency for power outputs less than 40 W.

Figure 6:
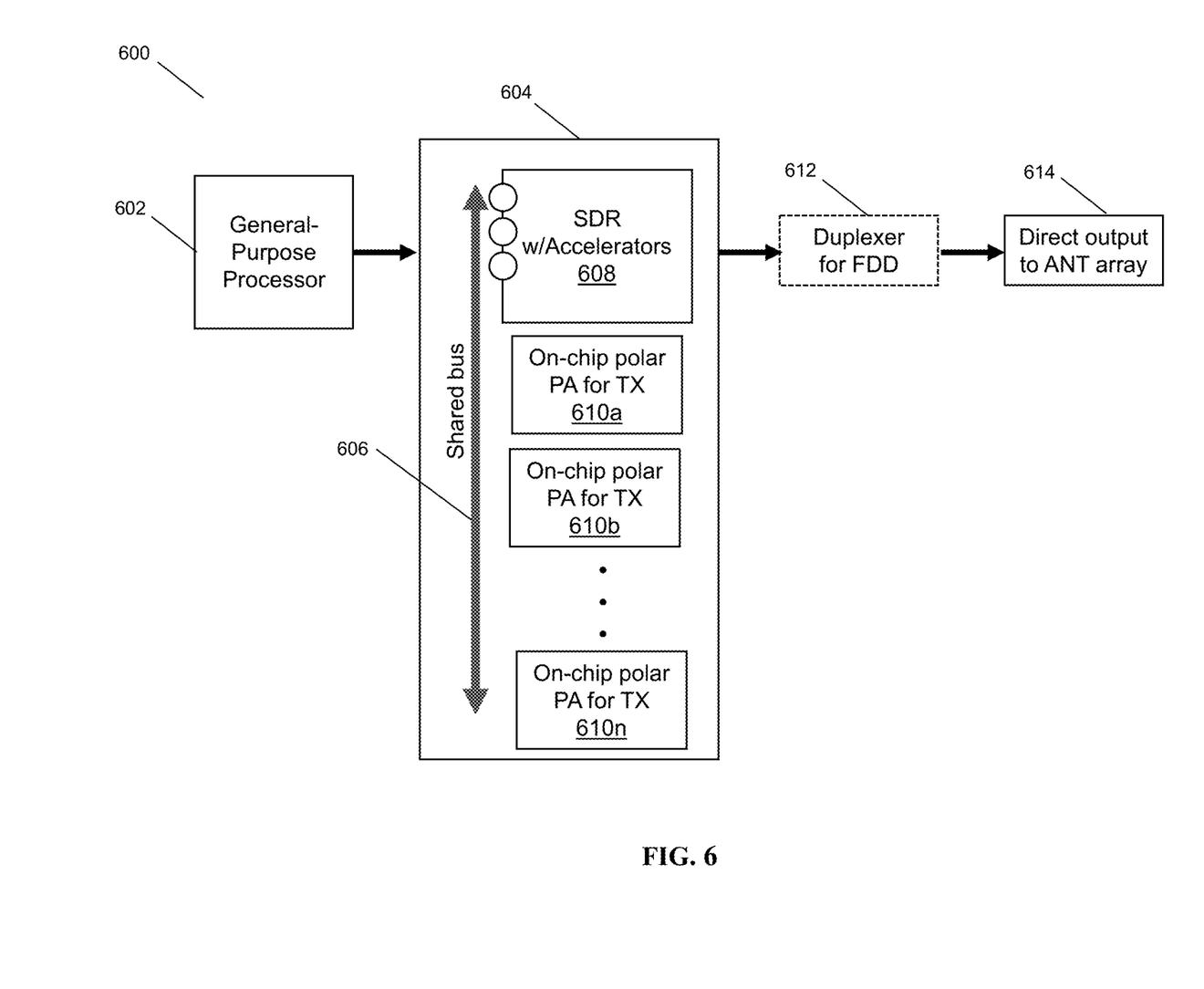
FIG. 6 depicts a diagram of a second microcomponent massive MIMO array architecture, in accordance with some embodiments.

Referring now to FIG. 6, a system 600 for providing a microcomponent massive MIMO array is shown, in accordance with further embodiments. The system 600 includes a general purpose processor 602 in communication with an integrated power amplifier and transmitter device 604. The integrated power amplifier and transmitter device 604 includes a Software Defined Radio (SDR) 108 with accelerators and a plurality of polar Power Amplifiers (PAs) 610a-610n. The polar PAs enable precise control of phase for high efficiency at the on-chip PA, as well as enabling beamforming even when ganged together in a MIMO array. Also shown is a shared bus 606, used for communication among the SDR and the PAs. An optional duplexer for Frequency Division Duplex (FDD) 612 is shown connected to the output of the integrated power amplifier and transmitter device 604. Also shown is the direct output to the antenna array 614.

Accelerators can be used in place of or in combination with SDRs, FPGAs and can provide DPD if needed. Multiple accelerators are shown schematically as part of SDR 608, coupled between the SDR and the shared bus 606. Any number of on-chip polar power amplifiers can be integrated onto the same system-on-chip, as well as any combination of accelerators. Multiple SDR units can provide additional processing power. Since the SDR and polar PA units are all implemented in silicon, the chip can be scaled up or down to provide processing and radio output power for different processing needs and/or different power needs by adding/subtracting silicon logic units. The logic units may be FPGAs.

RF filtering can be provided on each PA chip, or as one or more external filters, connected between the output and the RF emitter in the antenna array, providing flexibility for a single chip to be manufactured for use across a wide variety of frequencies in conjunction with appropriate filters.

Further details concerning the RF chain described herein are found in U.S. Provisional Pat. App. No. 62/712,172, entitled "System and Method for Massive MIMO Communication" and filed Jul. 30, 2018, hereby incorporated by reference.

The inventors have contemplated various additional variants of the present disclosure. A single system-on-chip could provide any of the following combinations of circuitry on the same chip: integrated baseband on the same chip; the entire RF chain on another chip, such RF chain including: a software-defined radio (SDR); 2 W PA; low-noise amplifier (LNA); filter; DPD and crest factor reduction (CFR) circuitry. Alternately, the baseband chip could be omitted and this functionality could be performed by a general-purpose chip.

Alternately, anywhere a radio chip is mentioned, a software-defined radio (SDR) could be used. Alternately, anywhere an FPGA, which is commonly used to implement an SDR, is mentioned, the FPGA could be replaced by a general purpose chip with a special-purpose accelerator logic circuit built in. Adding FPGA functionality to the digital radio chip is less costly than requiring an FPGA, as it is relatively cheap to add space to an existing die. Additional DPD, CFR functionality could be added to a chip as well. Demodulation, decoding, and analysis/control could be performed by circuitry either on the same chip as the RF chain or baseband chip, or on a general purpose chip, or on an FPGA, or via accelerators.

Some embodiments of an apparatus may include: a plurality of transceiver modules configured in an antenna array; a synchronization transmission circuit configured to transmit a synchronization signal to the plurality of transceiver modules; a receive carrier generation circuit configured to generate a receive carrier reference signal; and a synchronization processing circuit configured to process the synchronization signal and to align a phase of the receive carrier reference signal.

Some embodiments of an apparatus may include: a plurality of transceiver modules arranged in an array and configured to receive a digital baseband signal; a plurality of digital modulators and power amplifiers each configured to generate a transmit modulated signal from the digital baseband signal; and a combiner configured to combine the transmit modulated signals.

Some embodiments of an apparatus may include: a plurality of antenna elements on a panel array; a plurality of transceiver modules arranged on the panel array to be adjacent to one of the plurality of antenna elements and configured to receive a desired signal, wherein each transceiver module may include a plurality of digital demodulators, and includes a baseband signal combiner; a demodulation circuit configured to generate a demodulated baseband signal from each of the transceiver modules; and a combiner configured to combine the digital baseband signals at the panel array using the baseband signal combiners.

In a further embodiment, an omnidirectional antenna is contemplated by the inventors. Antenna elements formed according to the present disclosure are situated all around a single polar axis, enabling beamforming to different users off of a single telephone antenna. A single round antenna with a plurality of elements is considered. The round antenna may be shaped and may provide power for a base station on top of a telephone pole. The round antenna may alternately be an antenna for a single handset. By use of a combination of ganged polar PAs as described herein, beamforming is enabled even in a small antenna package.

Massive MIMO for cellular antennas involves many antennas, large array (64T64R). Polar combining architecture enables multiple antennas to be coordinated by adding signals (see U.S. patent application Ser. No. 16/286,548 and U.S. Provisional Pat. App. No. 62/635,294, each hereby incorporated by reference).

Configuration for Omnidirectional Antenna on a Base Station

Omnidirectional Antenna

Figure 7:
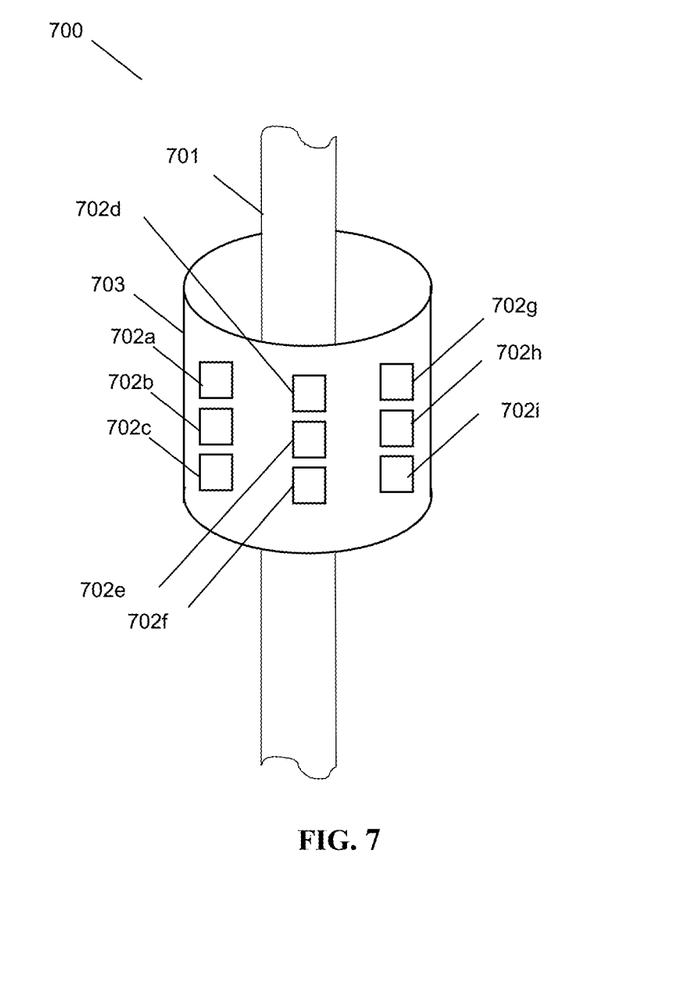
FIG. 7 depicts a diagram of an omnidirectional antenna on a base station, in accordance with some embodiments.

In some embodiments, radio transceiver elements can be coordinated and ganged together, positioned all around a central axis in, e.g., a cylindrical or curved orientation so that beamforming is enabled to different users off of a telephone pole. FIG. 7 depicts a diagram of an omnidirectional antenna 700 disposed on a pole 701. The omnidirectional antenna 700 includes a plurality of antenna elements, 702a-702i in accordance with some embodiments. An example embodiment may have 10 W total RF power. The antenna elements 702a-702i could be on a support element 703, which may be a cylinder or a torus. The omnidirectional antenna 700 could have antenna elements stacked vertically (3 shown here) or horizontally (each element would cover some fraction of the 360° circumference).

Another embodiment of an omnidirectional antenna could be on a handset. This type of omnidirectional antenna would be configured in a similar way as the omnidirectional antenna 700, but much smaller, for example, 4" by 1" round antenna. This type of antenna would have fewer elements but would still be able to have enough elements for beamforming. Smaller size for handset suggests that beamforming would be a natural fit for TX/RX of a higher frequency such as mm wave, which is suitable for 5G NR.

Directionality of Transmissions

Directional beams are more energy efficient—advantageous for both the base station and the handset. RF energy can be added up for peak power output using low cost devices without FPGAs (because the transmitters are operating at lower power individually, FPGA-utilizing techniques such as crest factor reduction are not needed). Multiple TX antennas can be provided with input signals such that their combined signal produces a single more powerful directional beam.

Some embodiments could be used for military applications. Advantages include that RF signature is smaller when a directional beam is used, making it harder for an enemy to detect the transmission and/or the location of the transmitter.

Public Safety High Power Device on a Vehicle

Some embodiments could be used for a 360° active antenna for a base station mounted on a vehicle. Higher power would be enabled due to directionality than would otherwise be possible. Total EIRP would be low so higher power would be enabled to be used by some embodiments. Base station could be used as a public safety base station and could be deployed quickly during disasters, see, e.g. U.S. Pat. App. Pub. No. US20190014585A1, hereby incorporated by reference.

In one embodiment of synchronized beamforming using MIMO antennas for improved Operations Security (opsec), assume synchronized with other transmitters, for example, 10 other people/base stations/transmitters. Could be Massive MIMO antennas. Relative location can be determined using sync and time of arrival. Frequency hopping can be used to make it harder for an enemy to detect. In a military context, it would be possible to create intentional signal noise, masking, jamming, cloaking, countermeasures signals. For example, a second transmitter could send the same output signal as the first transmitter, but using a different directionality on the beam, so that an enemy would not be able to determine the correct originating position.

In another embodiment of synchronized beamforming using MIMO antennas for improved opsec, assume synchronization is very accurate (down to sub-1 wavelength), for example, using a technique permitting single digit parts per billion synchronization. Multiple transmissions could be synchronized and sent to the same receiver from different locations, reinforcing the effective signal. A modulation scheme that covers 2-3 wavelengths per symbol could be used.

In another embodiment of synchronized beamforming using MIMO antennas for improved opsec, if synchronized to another signal, such as a high-power television signal, it would be possible to transmit in sync with the higher-power signal, thus intentionally creating interference for any enemies who may be attempting to receive and track. Directionality will enable the proper receiver to receive the signal.

In some embodiments, the foregoing discussion involves MIMO antenna components that are enabled to be combined or ganged together, for example, as described in U.S. patent application Ser. No. 16/286,548, "Microcomponent Massive MIMO Arrays" filed Feb. 26, 2019 and hereby incorporated by reference. The MIMO antenna components could be combined using a polar combining architecture, as described therein.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" or "feature" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

What is claimed is:

1. An antenna array comprising:
a support structure;
a plurality of antenna elements positioned around a singular axis of the support structure, the support structure having a cylindrical or toroidal shape, and mounted to the support structure, the antenna elements including integrated polar Power Amplifiers (PAs) and polar transmitters with phase control, wherein the polar PAs form a polar phased array enabling beamforming;
wherein the plurality of antenna elements are used to provide signal transmissions using beamforming for a Radio Technology including at least one of 2G, 3G, 4G or 5G, to different users off of a single omnidirectional antenna from one or more of a plurality of antenna elements positioned around a singular axis of the omnidirectional antenna toward an intended receiver; and
synchronizing the signal transmissions from the omnidirectional antenna array with other transmitters by synchronizing the signal transmissions from the omnidirectional antenna array with multiple transmissions and sending to a same receiver from different locations, reinforcing the effective signal.

2. The antenna array of claim 1 wherein the array is mounted on a pole at a predetermined distance from the ground.

3. The antenna array of claim 1 wherein the array is situated in a mobile device.

4. The antenna array of claim 1 wherein the support element is a cylinder or a torus.

5. The antenna array of claim 1 wherein the antenna elements are stacked vertically, horizontally, or both vertically and horizontally on the support element.

6. The antenna array of claim 1 wherein the antenna array additively combines outputs of subsets of radio chips with high efficiency for power outputs of less than forty watts.

7. A method of performing beamforming using an omnidirectional antenna array, comprising:
    providing signal transmissions from one or more of a plurality of antenna elements positioned around a singular axis of a support structure, the support structure having a cylindrical or toroidal shape, toward an intended receiver, the antenna elements including integrated polar Power Amplifiers (PAs) and polar transmitters with phase control, wherein the polar PAs form a polar phased array enabling beamforming for a Radio Technology including at least one of 2G, 3G, 4G or 5G; and
    synchronizing the signal transmissions from the omnidirectional antenna array with other transmitters by synchronizing the signal transmissions from the omnidirectional antenna array with multiple transmissions and sending to a same receiver from different locations, reinforcing the effective signal.

8. The method of claim 7 wherein synchronizing the signal transmissions from the omnidirectional antenna array with other transmitters includes synchronizing the signal transmissions from the omnidirectional antenna array with a high-power signal to intentionally create interference for anyone attempting to receive and track a location of the omnidirectional antenna array.

9. The method of claim 7 further comprising additively combining outputs of subsets of radio chips with high efficiency for power outputs of less than forty watts.

* * * * *